United States Patent [19]
Perrault et al.

[11] B 3,919,458
[45] Nov. 11, 1975

[54] ELECTRICAL BOX MOUNTING ARRANGEMENT

[76] Inventors: Frederick Perrault, 2644 W. 225th St., Torrance, Calif. 90505; Raymond E. Perrault, 23441 Batey Ave., Harbor City, Calif. 90710

[22] Filed: Dec. 13, 1973

[21] Appl. No.: 424,415

[44] Published under the Trial Voluntary Protest Program on January 28, 1975 as document no. B 424,415.

[52] U.S. Cl. .................... 174/51; 174/58; 220/3.9; 248/DIG. 6
[51] Int. Cl.² .......................................... H02G 3/10
[58] Field of Search .......... 174/58, 53, 51; 220/3.2, 220/3.3, 3.9, 3.92; 248/DIG. 6

[56] References Cited
UNITED STATES PATENTS

| | | | |
|---|---|---|---|
| 2,461,145 | 2/1949 | Craver | 220/3.9 X |
| 2,512,188 | 6/1950 | Wait | 220/3.9 X |
| 3,673,310 | 6/1972 | Welsh | 174/58 |

*Primary Examiner*—J. V. Truhe
*Assistant Examiner*—David A. Tone
*Attorney, Agent, or Firm*—Gausewitz, Carr & Rothenberg

[57] ABSTRACT

An electrical junction box mounting arrangement which includes a cup-shaped member having a flange at its open end engaging the periphery of an opening through the inner wall of a junction box, with the remainder of the cup-shaped member extending through the opening, a spacer sleeve circumscribing the projecting portion of the cup-shaped member and engaging the wall of the junction box and the surface to which the same is to be secured, a stud extending from the surface through the spacer sleeve and an opening in the cup-shaped member where it is engaged by a nut which clamps the elements in place, the spacer sleeve optionally including teeth in its end surfaces.

11 Claims, 3 Drawing Figures

ELECTRICAL BOX MOUNTING ARRANGEMENT

BACKGROUND OF THE INVENTION

1. Field of the Invention

This invention pertains to a mounting arrangement for an electrical junction box.

2. Description of Prior Art

A particularly difficult situation for mounting an electrical box is in the construction of ships where no handy beams or brackets may be available to which to secure the box. Instead, there may be only a metal bulkhead or deck presenting a flat surface where the box is to be secured. Existing practices have been complex, often expensive and frequently do not securely support the box around its mounting fixture. In the design, such as shown in U.S. Pat. No. 3,673,310, the mating threads on the stud and on the sleeve attached to the box cannot be tightened so as to assure that the box always assumes the proper attitude for permitting appropriate attachment of wires. Other mounting arrangements for electrical boxes of various kinds are shown in U.S. Pat. Nos. 1,874,435, 2,914,601, 3,012,090, 3,025,338 and 3,395,243.

SUMMARY OF THE INVENTION

The present invention provides an improved electrical box mounting arrangement particularly adapted for use in ship construction. It provides a secure attachment for the box, enabling it to be firmly positioned in any attitude, yet attached quite easily and rapidly. The box is spaced appropriately from the bulkhead when secured so that moisture cannot accumulate, while the spacer provides for drainage of any moisture that might accumulate in that area. The mounting arrangement occupies virtually no volume within the interior of the box, so that the entire space within the box is available for making the electrical connections.

The invention includes a cup-shaped member having a flange at one end and a concave portion that fits through an opening in the inner wall of the box. A spacer sleeve circumscribes the portion that extends through the wall of the box and also fits around a stud that is welded to the bulkhead or the like. The stud extends through an opening in the cup-shaped member, where it is held by a nut. The force of the nut securely clamps the flange of the cup-shaped member against the inner surface of the wall of the box, while the spacer sleeve is forced against the opposite side of this wall. The other end of the spacer sleeve engages the bulkhead and spaces the box outwardly, while frictionally resisting any rotational forces. A slot in the spacer sleeve provides for drainage of any moisture. In an alternate embodiment, teeth may be employed on the ends of the spacer sleeve to enhance electrical grounding.

DESCRIPTION OF THE PREFERRED EMBODIMENT

Figure 1:
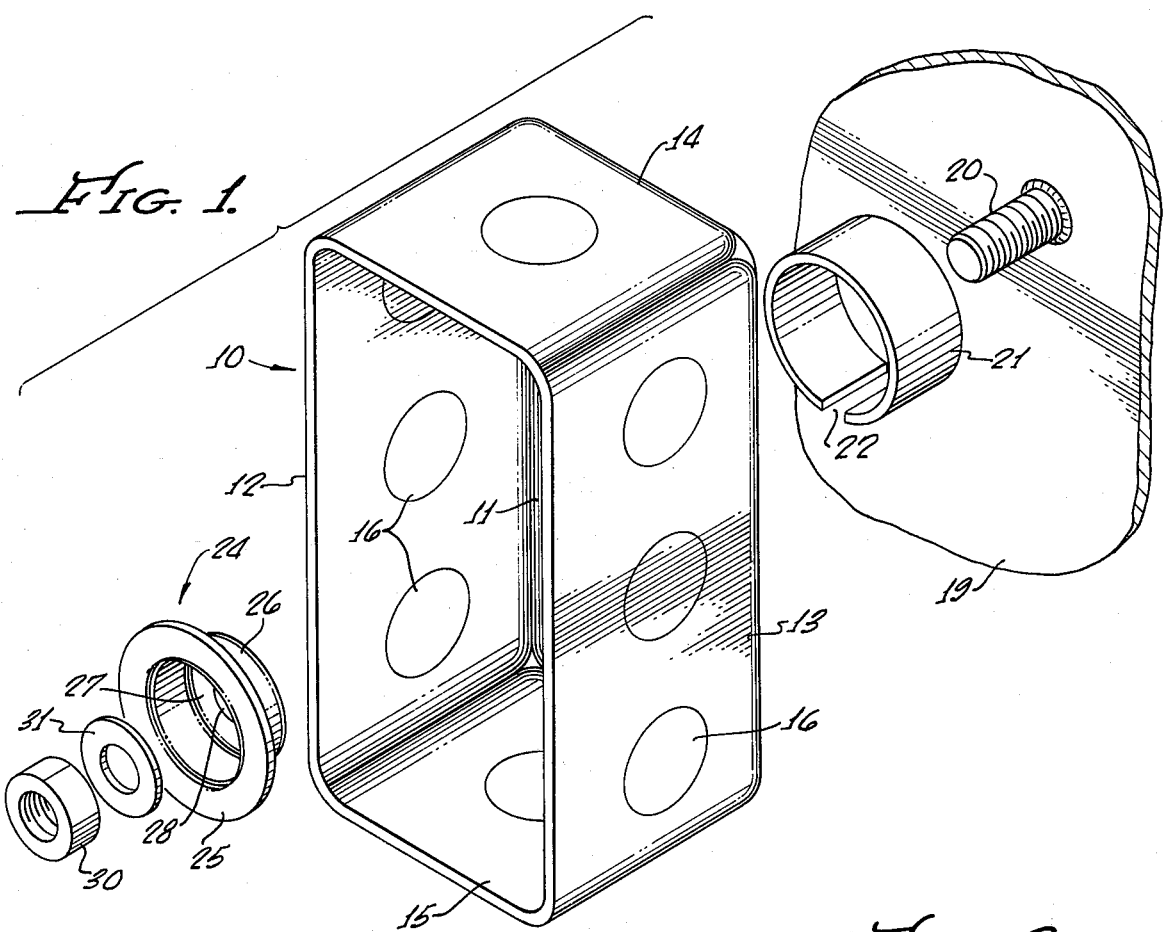
FIG. 1 is an exploded perspective view of the components of the device of this invention.
Figure 2:
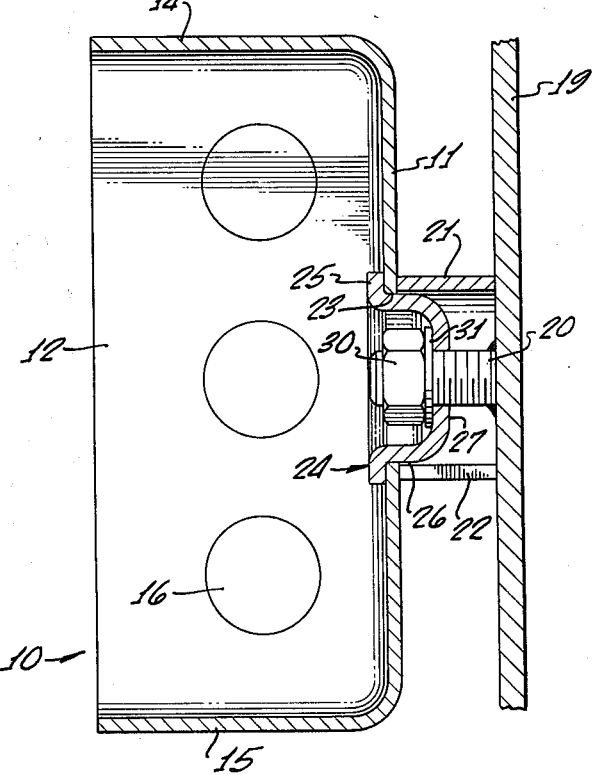
FIG. 2 is a longitudinal sectional view showing the junction box in the mounted position.

The electrical junction box 10 is of generally conventional construction, including an inner wall 11 from which project sidewalls 12 and 13, as well as end walls 14 and 15. Circular knockouts 16 are provided in the side and end walls of the box 10 for permitting entry of wiring. A suitable cover (not shown) is placed over the open side of the box opposite the inner wall 11 when the installation is completed.

The box 10 is to be mounted on a structure 19, such as a bulkhead or deck of a ship. As part of the installation, a short threaded stud 20 is welded to the bulkhead 19 to project perpendicularly from it. Around the stud 20 is placed a tubular spacer 21, which has a length slightly less than that of the stud 20. A longitudinal slot 22 extends for the length of the spacer 21. When the device is installed, the slot 22 is placed at the lowermost position, providing a drain for any moisture which might tend to collect within the spacer 21. The interior diameter of the spacer 21 approximates that of an opening 23 formed in the center of the inner wall 11 of the junction box 10.

The mounting arrangement also includes a cup-shaped member 24, which includes an annular radial flange 25 and a domelike portion having a generally cylindrical wall 26 extending from the flange to a radial end wall 27. An opening 28 extends through the center of the end wall 27. The cup-shaped member 24 is dimensioned so that the cylindrical wall 26 will fit substantially complementarily within the opening 23 in the inner wall 11 of the box 10, while the flange 25 overlies the inside surface of the wall 11. In this position, the cylindrical wall 26 is generally complementarily received within the interior of the tubular spacer 21.

The remaining components of the assembly include a nut 30 for engaging the stud 20, as well as a suitable lock washer 31.

In assembling the box 10 to the bulkhead 19, the cup-shaped member 24 is positioned with its cylindrical wall 26 in the opening 23 of the wall 11. The spacer 21 is located around the stud 20, and the box 10 is brought to a position where the cylindrical wall 26 extends into the spacer, with the opening 28 in the radial wall 27 complementarily receiving the stud 20. With the cup-shaped member 24 centered on the stud 20 by the opening 28, the wall 26 of the member 24 centers the spacer with respect to the stud 20 and the opening 23 in the wall 11. The lock washer 31 then is positioned on the stud with the cup-shaped member 24, and the nut 30 is threaded onto the stud. Tightening the nut causes the wall 11 to be clamped between the flange 25 of the cup-shaped member 24 and one of the radial ends of the spacer 21 at the periphery of the opening 23 in the wall 11. The other end of the spacer 21 is forced against the bulkhead 19. The tightening of the nut, therefore, secures the box 10 to the bulkhead 19, completing the installation of the box in only a few moments of time.

The box 10 may be positioned in the proper attitude at the time the nut is tightened and, with the nut secured, will remain in that position for appropriately receiving the electrical components to be associated with it. The length of the stud 20 is correlated to the length of the spacer 21 and the thicknesses of the flange 25 and the wall 11 so that the stud does not extend into the box beyond the surface of the flange. Therefore, virtually the entire volume of the box 10 is usable because the nut and stud are recessed.

Figure 3:
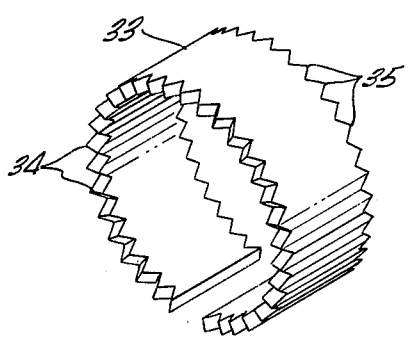
FIG. 3 is a perspective view of a modified spacer sleeve.

A modified spacer 33, shown in FIG. 3, may be used in lieu of the spacer 21 for assurance of an improved grounding connection. The spacer 33 is similar to the spacer 21, but is provided with teeth 34 and 35 on its opposite ends. When the spacer 33 is used and the nut is tightened to clamp the box in place, the teeth 34 at one end will dig into the outer surface of the wall 11 to enhance the electrical connection between the box and the spacer. Similarly, at the opposite end of the spacer, the teeth 35 dig into the surface of the bulkhead to assure an electrical connection at that location. This will occur even if there should be paint or other foreign matter on the surface of either the bulkhead or the box. The teeth also can give improved resistance to rotation of the box in the event that severe torque loads should be imposed upon it. However, it is not always desirable to utilize the spacer 33 where the bulkhead is subjected to continual flexing and vibration as commonly encountered on a ship. This is because stress risers occur where the teeth dig into the bulkhead, thus raising the question of an ultimate fatigue failure.

The foregoing detailed description is to be clearly understood as given by way of illustration and example only, the spirit and scope of this invention being limited solely by the appended claims.

We claim:

1. In combination with a support structure, an electrical box assembly comprising
   a box adapted to receive electrical components,
      said box having an inner wall and additional walls extending from said inner wall,
      said inner wall having an opening therethrough,
   a first threaded element,
   a second threaded element,
      said first threaded element being attached to said support structure,
   a spacer adjacent said first threaded element,
      one end of said spacer engaging said structure and the opposite end of said spacer engaging the outside surface of said inner wall of said box,
   and a member having
      a first portion engaging the inside surface of said inner wall,
      and a second portion extending from said first portion through said opening in said inner wall,
      said second portion having an opening therethrough receiving one of said threaded elements,
   said second threaded element being meshed with said first threaded element and engaging second portion of said member for exerting a force on said member to clamp said inner wall between said spacer and said first portion of said member, and to force said spacer against said structure for thereby securing said box to said structure.

2. A device as recited in claim 1 in which said second portion of said member provides a recess, said second threaded element being entirely received within said recess.

3. A device as recited in claim 1 in which said spacer is a sleeve engaging said inner wall around said opening in said inner wall, said second portion being received in said sleeve.

4. A device as recited in claim 3 in which said sleeve includes opening means in the wall thereof for permitting drainage from the inside of said sleeve.

5. A device as recited in claim 4 in which said opening means is a longitudinal slot extending from one end of said sleeve to the other, said slot being positioned at the lowermost portion of said tubular member.

6. A device as recited in claim 3 in which said second portion has an outer wall substantially complementary to the interior of said sleeve, whereby said second portion aligns said sleeve for said engagement with said inner wall around said opening.

7. A device as recited in claim 6 in which said first threaded element is a stud and said second threaded element is a nut.

8. A device as recited in claim 7 in which said opening in said second portion is in the center thereof and substantially complementary to said stud, whereby said member is centered relative to said opening in said inner wall.

9. A device as recited in claim 8 in which
   said member is generally cup-shaped,
      said first portion including a flange overlying said inside surface of said inner wall around the periphery of said opening therethrough,
      said second portion having a domelike configuration.

10. A device as recited in claim 9 in which said stud projects substantially no farther than the outer surface of said flange, and said nut is received in said second portion, whereby substantially the entire volume of the inside of said box is unobstructed thereby.

11. A device as recited in claim 3 in which said spacer includes teeth in the opposite ends thereof for becoming embedded in said inner wall and said structure.

* * * * *